L. Carman,
87363/4X
Horse Power.
Patented Apr. 2, 1835.
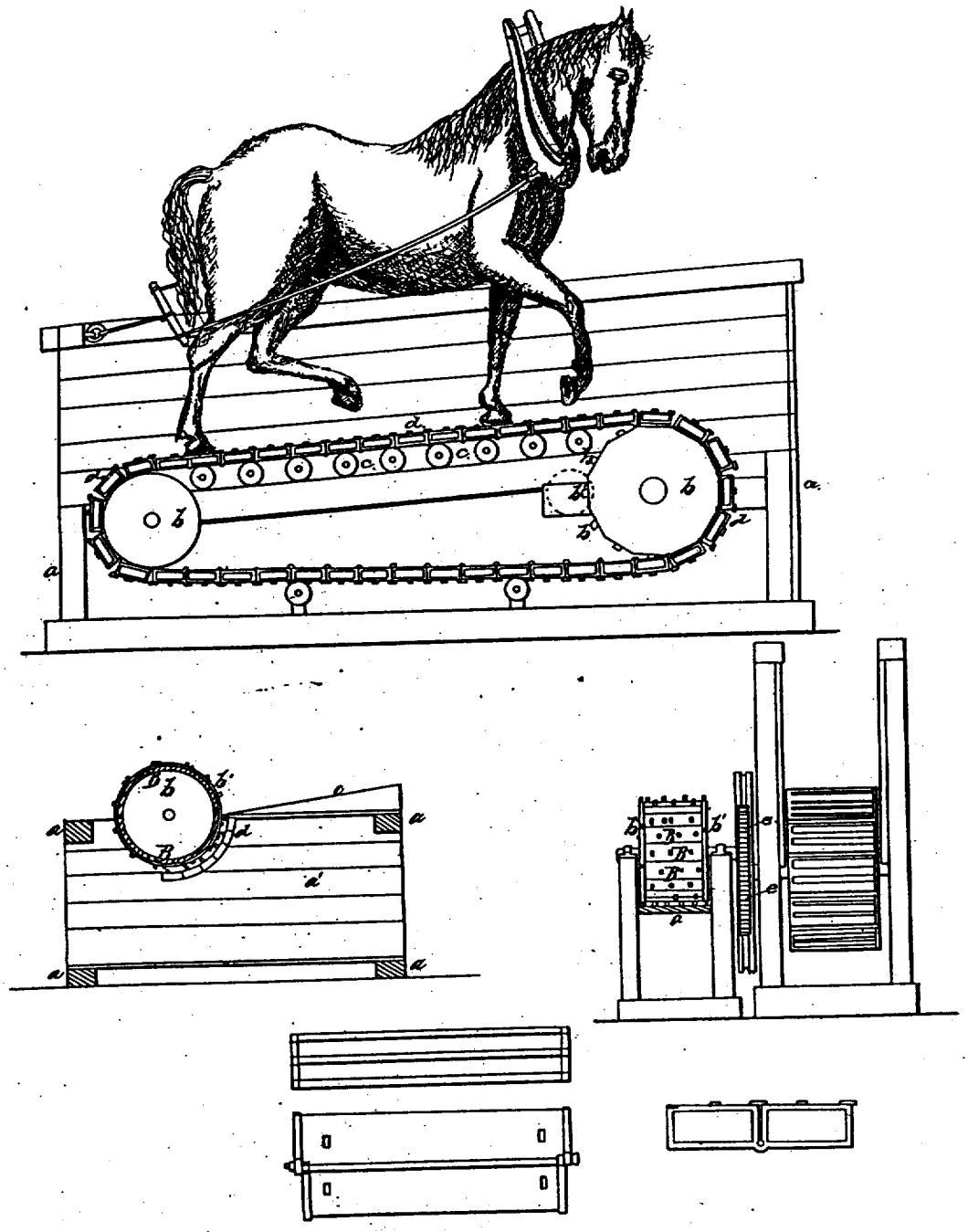
AM. PHOTO-LITHO. CO. N.Y. (OSBORNE'S PROCESS)

Luther Cinnamon of Oxford Maine

Letters Patent

The Schedule referred to in these Letters Patent and making part of the same containing a description in the words of the said Luther Cinnamon himself of his improvement in threshing machines for threshing and cleaning grain of all kinds.

To all to whom these presents shall come. Be it known that I the said Luther Cinnamon of Oxford in the County of Oxford and State of Maine, yeoman, have invented a new and useful improvement in the art or manner of making and constructing threshing machines for threshing and cleaning all kinds of grain, of which the following specification is a full and exact description of the construction & operation as invented and improved by me.

1. I make a frame thirty inches high and five feet long, the sides of plank and thirteen inches wide in the clear, on the upper side of this frame, and at the back end I hang my beater or threshing wheel thirteen inches long and eighteen inches in diameter. An inclined plain running out the rest of the length of the frame is placed [illegible] in front of the threshing wheel rising six inches in the whole length from the threshing wheel to the front end of the frame. On this inclined plain the grain is fed into the machine as it is threshed.

2. This threshing wheel is made and put together in the following manner. The shaft of the wheel is round iron about one and a half inch and turned true. Within the bearings on this shaft I put two cast iron heads, five eighths .... inch thick and nineteen inches in diameter and thirteen inches apart from outside to outside. These heads should go on hard on to the shaft and are made fast so as not to turn round on it by a feed of iron let into the shaft and into the head on the inside. Some mechanics call this feed piece a dutchman. A groove is cast on the inside of each head with one quarter inch of the circumference all round, and one quarter inch deep, and half an inch wide, to receive and hold the ends of the staves which make 8736 3/4 X the barrel of the wheel. These staves are made of cast iron about [illegible]
and a half inches long half inch thick and four and a half inches wide.
so that twelve staves just make the circumference of the wheel. I have
three teeth on the outside of each stave. These teeth are so placed on the
stave that by alternately shifting the ends of the staves from left to right
the teeth on one stave come exactly between the teeth on the other stave
all round the wheel. The ends of these staves are set into the groovings in
the two heads aforesaid. These teeth are cast with the stave itself, and
are about two inches long one and a half inch broad, and three quarters
of an inch thick at the butt, and half these sizes at the top, and a
true taper from the butt to the point. I have six teeth also standing
out on the circumference of each head, about one and three quarters inch
or so long as to come level with the tops of the teeth on the staves. These
teeth also do their part in threshing; These staves are held into the
groovings in the heads by six bolts which pass through under every
other stave, from one head to the other, having having a head on one
end and a nut on the other by which the heads and staves are brought
firmly together. I have put but six staves on the threshing wheel
in my model. though I build the operative machines with twelve
as above described. 3. The threshing wheel above described plays
in the concave segment of about one quarter of a circle about twenty
inches in diameter placed in front of the wheel and reaching from
the horizontal centre in front to the perpendicular centre or a little
beyond on the under side. This segment is made of six [illegible]
on a circle of about twenty inches ... diameter. These staves are of
cast Iron half inch thick and about three inches wide and fourteen
inches long. Each end of these is set in a circular grooving cut in the
inside of the frame about half an inch deep. I have five teeth on one
stave and four on the other of the same dimensions as the teeth on
the staves on the wheel. These staves having five teeth are placed
alternately with those having four teeth, one after the other, and the
teeth are so placed on the respective staves, that the teeth on one stave
come exactly between the teeth on the other staves, and these teeth 8736 3/4X on the staves in the concave pass between the teeth on the cylinder which
by one side and the other. By these means the friction of the grain is
shifted from one set of teeth to the other which making it more certain
to thresh clean. There is a screw on each side of the frame on each
end of each stave in the concave segment, by which each stave in the con-
cave can be so set and moved [illegible], as to bring the teeth on each [illegible]
in the concave exactly between the teeth on the wheel. Then I put
three or four long bolts across the machine under the segment to hold
the staves firm in their places. The space between the ends of
the teeth on the wheel and segment should be about one eighth of an
inch. and also between the teeth on the wheel and the teeth on the
segment as they pass each other, or so large a space as to admit
the kernels of grain . . . . . to pass through these spacements
without being broken or bruised. 4. I put a pulley about six
inches . . . . . . . . . in diameter and four broad on one end of
the shaft around which a belt passes from the large pulley on the hors
power by which the thresher is put and kept in motion.

5. The above described thresher is connected with another ma
chine, called a horse power by a belt. which is built and put in [illegible]
as follows. I build a frame eleven feet long, five feet eight inches
high. and eighteen inches wide in the clear, and planked on the
inside and at the front end. ~~At the forward end~~. I place
a block wheel two feet in diameter, and at the after end another bloc
wheel eighteen inches in diameter. The circumference of the forward
wheel is divided into twelve equal parts. and these sections are made
flat and fair all across the wheel and a cog of proper size is in the
centre near each end. The after block wheel is left round. These
wheels have a cast iron shaft of proper length with a flanch on
each having about six inches diameter and plank are bolted on
to these to make the heads. Between these block wheels put eight sta-
tionary rollers four inches in diameter their upper sides being level with
the block wheels. Then I put two stationary rollers between the block
wheels on the under side. their upper surfaces being two inches below 8736 3/4 X belt chain and as he puts the chain in motion the chain moves
the forward block wheel. The odds ... in diameter between the two
block wheels having the under sides level, makes the upper sec-
tion of the chain an inclined plane of six inches in the whole
length which gives the Horse a great advantage. The Horse is hitched
to the hinder part of the machine by a pair of traces collar and
whiffletree as to a carriage. 8. On the outside of this Horse
power machine, is a cog wheel two feet in diameter which matches
into a trundle head of six inches diameter. This large cog wheel
is fastened on to one end of the shaft of the forward block wheel
On the outer end of the shaft of this trundle head, is a pulley
three feet in diameter. This Horse power machine and the thresh-
ing machine are placed beside each other, so that a belt is passed
round this large pulley on the end of the shaft of the trundle
head, and round the pulley on the end of the shaft of the threshing m.
In this way the threshing machine is put and kept in motion.
These two machines standing on one platform, may be so fixed
that one may be moved endwise by screw or wedge by which mea
the band may be tightened or slackened. Any of the above dimen
sions may be varied as convenience may require.

In the above specification I have described and set forth all the
several parts of the aforesaid machines but I do not claim the whole
as my invention. The parts that I claim as my own invention are
the peculiar manner of constructing and putting together the thresh
ing wheel, that is those parts of it that are made of cast iron and
also the peculiar manner of constructing & putting together concave
segment. On the Horse power I claim only the peculiar man
of constructing the belt band or chain on which the Horse tra
and the manner of putting it together. In testimony that the
above is a true specification of my said improvement as above described I
have hereunto set my hand this ninth day of January in the year of our Lord
one thousand eight hundred and thirty five Witnesses { Jonathan Morgan
Fred Allen Luther Carman.

(2188 Words)

drawings Made